US010885366B2

(12) United States Patent
Murakami

(10) Patent No.: US 10,885,366 B2
(45) Date of Patent: Jan. 5, 2021

(54) INPUT INFORMATION MANAGEMENT APPARATUS AND INPUT INFORMATION MANAGEMENT METHOD

(71) Applicant: FUJITSU LIMITED, Kawasaki (JP)

(72) Inventor: Iori Murakami, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 87 days.

(21) Appl. No.: 16/274,461

(22) Filed: Feb. 13, 2019

(65) Prior Publication Data

US 2019/0258887 A1 Aug. 22, 2019

(30) Foreign Application Priority Data

Feb. 20, 2018 (JP) ................................. 2018-027850

(51) Int. Cl.
*G06F 21/36* (2013.01)
*G06K 9/22* (2006.01)
*G06F 3/0354* (2013.01)

(52) U.S. Cl.
CPC ......... *G06K 9/222* (2013.01); *G06F 3/03545* (2013.01); *G06F 21/36* (2013.01)

(58) Field of Classification Search
CPC combination set(s) only.
See application file for complete search history.

(56) References Cited

U.S. PATENT DOCUMENTS

2010/0045636 A1* 2/2010 Noguchi ............. G06F 3/03545 345/179
2013/0120252 A1* 5/2013 Lam ...................... G06F 3/0416 345/157
2013/0328770 A1* 12/2013 Parham ................. G06F 3/0486 345/157
2014/0078089 A1* 3/2014 Lee ..................... G06F 3/04883 345/173
2014/0267019 A1* 9/2014 Kuzmin .................. G06F 3/017 345/156
2014/0298266 A1* 10/2014 Lapp ................... G06F 3/04886 715/835
2016/0098969 A1* 4/2016 Lee ..................... G06F 3/04883 345/156
2016/0188016 A1* 6/2016 Munakata ............. G06F 3/0442 345/179
2019/0065027 A1* 2/2019 Hauenstein ............. G06F 3/011

FOREIGN PATENT DOCUMENTS

| | | |
|---|---|---|
| JP | 2008-129925 | 6/2008 |
| JP | 2010-033363 | 2/2010 |
| JP | 2014-120023 | 6/2014 |
| JP | 2016-186809 | 10/2016 |
| WO | 2014/061095 | 4/2014 |

* cited by examiner

*Primary Examiner* — Omar S Ismail
(74) *Attorney, Agent, or Firm* — Fujitsu Patent Center

(57) ABSTRACT

An input information management apparatus includes one or more sensors, one or more memories, and one or more processors coupled to the one or more memories and the one or more processors configured to acquire a first input and a second input detected by the one or more sensors, associate a first region related to the first input with identification information of a first user according to the second input, and store, when a third input in the first region is detected, information related to the third input in association with the identification information of the first user into the one or more memories.

13 Claims, 16 Drawing Sheets

100
PLACE SERVER
STORAGE UNIT
110
111
CONTENT MANAGEMENT INFORMATION
112
BASE MANAGEMENT TABLE
113
USER MANAGEMENT TABLE
114
CONTENT DATA (IMAGE DATA)
115
CONTENT DATA (IMAGE DATA)
120
CONTENT MANAGEMENT UNIT
130
BASE AND USER MANAGEMENT UNIT
300
200
SPATIAL UI CLIENT
210
PEN RECOGNITION UNIT
220
SPACE DISPLAYING UNIT
230
SPACE MANAGEMENT UNIT
240
CONTENT SETTING SECTION
250
USER SETTING SECTION
32
31

```
{  [    {
      "place" : "BASE A",  "ip-address" : "10.xxx.xxx.001",
      "Contents": {
         [
            "id": "xxxxxxxxxxxxxxx",
            "Author": "MURAKAMI",
            "type": "label",
            "data":  {
               "imagepath" : "/imagepath"
            },
            "coordinates": {
               "x": "100", "y": "200"
            }
            "size": {
               "width": "200", "height": "300",
            }
            "security": {
               "users": {
                  [ "userId": "xxxxxx", "username": "NAME"···,
                     "permission": {
                        "fullcontrole": true
                        "update": true,
                        "read": true,
                        "write": true
}]}}]}}]}
```

| BASE NAME | IP ADDRESS |
| --- | --- |
| BASE A | xxx.xxx.xxx.xxx |
| BASE B | yyy.yyy.yyy.yyy |
| ... | ... |

| USER ID | PASSWORD |
| --- | --- |
| MURAKAMI | |
| HONDA | |
| ⋮ | ⋮ |

INPUT INFORMATION MANAGEMENT APPARATUS AND INPUT INFORMATION MANAGEMENT METHOD

CROSS-REFERENCE TO RELATED APPLICATION

This application is based upon and claims the benefit of priority of the prior Japanese Patent Application No. 2018-27850, filed on Feb. 20, 2018, the entire contents of which are incorporated herein by reference.

FIELD

The embodiments discussed herein relate to an input information management technology.

BACKGROUND

As one of technologies relating to a user interface (UI) of a computer, there is a spatial UI technology that makes the entire room have a UI function. In the spatial UI technology, a user performs a character filling behavior and so forth using an electronic pen, which outputs an infrared ray, for example, within an image region projected by a projector. In response to the behavior, the computer reads a locus of the irradiation destination of the infrared ray from a picked up image by an infrared camera, interprets meanings of the behavior performed by the user based on the locus and executes a process according to the behavior. For example, if the user uses the electronic pen to perform a behavior for writing a character on a table, the computer recognizes the written character. Then, the computer displays the pertinent character on the table by the projector.

Regarding the UI, various technologies have been conceived for the enhancement of the convenience to a user. For example, there is a data inputting apparatus which may be operated comfortably, for example, irrespective of the proficiency level of the operation method and suppress occurrence of malfunction. Further, there is a display apparatus which enhances the operability of a position indication operation for indicating a particular position of an image displayed on a display face. Furthermore, there is an object operation apparatus which appropriately processes processing instruction operations of one or a plurality of users for a same object and reflects a result of the operations efficiently and precisely on the processing substance of the object. Also there is a profile generation apparatus that makes it possible to simply generate a profile of a user without requesting the user for a computer operation. Also there is an information displaying apparatus which allocates different functions to be executed depending upon a user operation for a window inside region that is a region on the inner side of a window and a user operation for a window outside region that is region on the outside of the window.

Examples of the related art include Japanese Laid-open Patent Publication No. 2016-186809, Japanese Laid-open Patent Publication No. 2014-120023, Japanese Laid-open Patent Publication No. 2010-033363, Japanese Laid-open Patent Publication No. 2008-129925 and International Publication Pamphlet No. WO 2014/061095.

SUMMARY

According to an aspect of the embodiments, an input information management apparatus includes one or more sensors, one or more memories, and one or more processors coupled to the one or more memories and the one or more processors configured to acquire a first input and a second input detected by the one or more sensors, associate a first region related to the first input with identification information of a first user according to the second input, and store, when a third input in the first region is detected, information related to the third input in association with the identification information of the first user into the one or more memories.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram depicting an example of content management information;

FIG. 8 is a diagram depicting an example of a user management table;

DESCRIPTION OF EMBODIMENTS

In a computer, creators of input information are usually managed in a unit of a file or the like. The information on the creators of input information is utilized, for example, for management and so forth of an access light to input information. However, in the case where a locus of the irradiation destination by an electronic pen is tracked to recognize an input of input information of a character or the like, the related technology relating to the spatial UI fails to identify who is the subject of the input of the input information. Therefore, the related technology fails, for example, to appropriately manage the access right to the input information.

In the following, embodiments are described with reference to the drawings. It is to be noted that each embodiment may be carried out in combination of a plurality of embodiments within a consistent range.

First Embodiment

First, a first embodiment is described. The first embodiment implements an input information management method capable of discriminating a creator of information inputted to a spatial UI.

Figure 1:
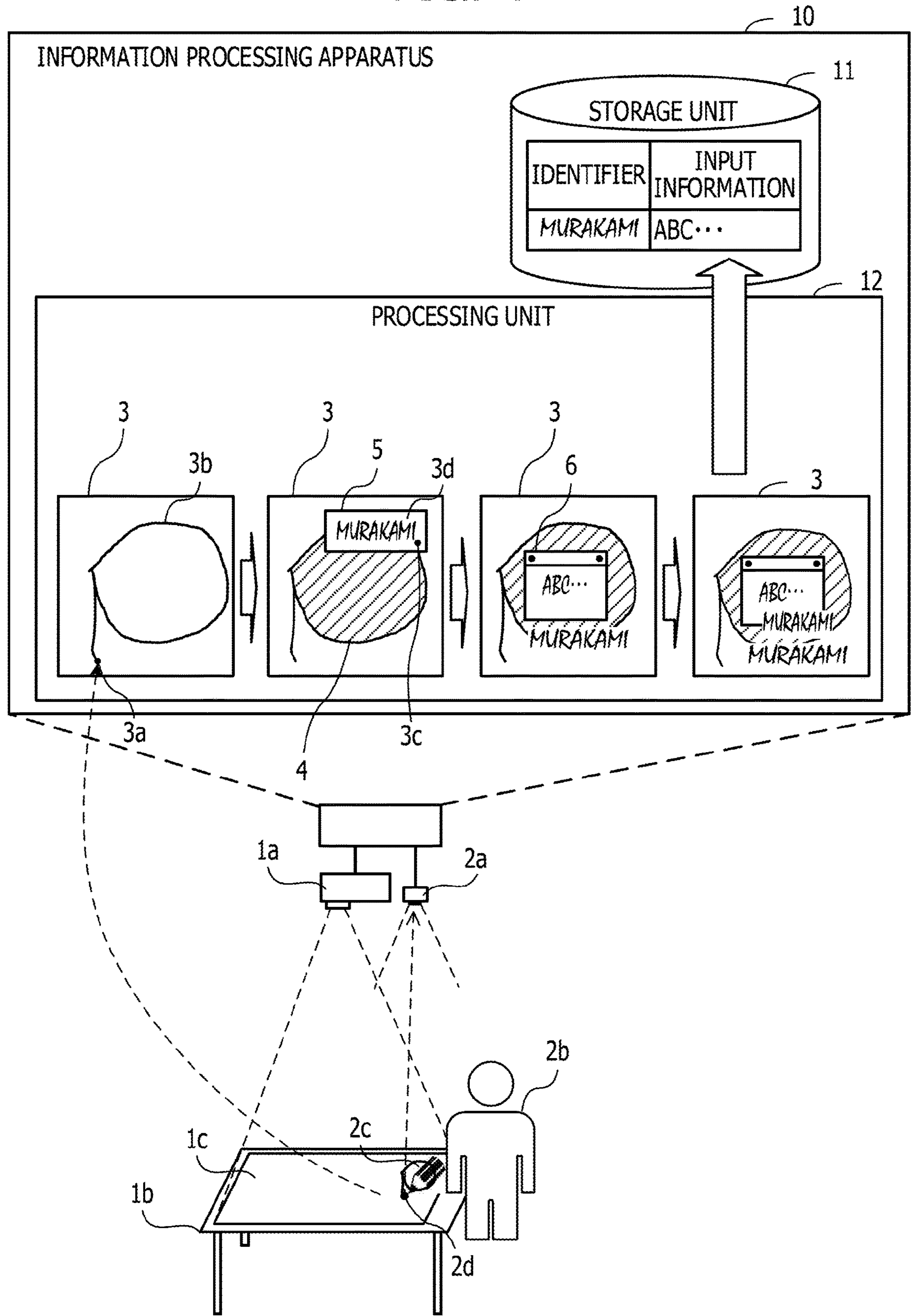
FIG. 1 is a diagram depicting an example of an input information management method according to a first embodiment.

FIG. 1 is a diagram depicting an example of an input information management method according to the first embodiment. In the first embodiment, an information processing apparatus 10 stores input information 6 inputted by a user 2*b* who is a behavior subject using a spatial UI in an associated relationship with an identifier of the user 2*b* who is a creator of the input information 6. The information processing apparatus 10 is an example of an input information management apparatus. To the information processing apparatus 10, a projector 1*a* and a camera 2*a* are coupled. The information processing apparatus 10 uses the projector 1*a* to display an image (projection image 1*c*) on a target 1*b*. The camera 2*a* images light of a wavelength outputted from an electronic pen 2*c*. The electronic pen 2*c* may output a ray of light from a distal end thereof. The ray of light outputted from the electronic pen 2*c* is a visible ray or an invisible ray. The invisible ray is, for example, an infrared ray. In the case where the electronic pen 2*c* outputs an infrared ray, the camera 2*a* is an infrared camera that images an infrared ray. The information processing apparatus 10 images the projection image 1*c* within a display range by the camera 2*a* to acquire a picked up image 3.

It is to be noted that, although, in FIG. 1, also an object (a personal use region 4, an identifier inputting region 5, input information 6 or the like) within the projection image 1*c* displayed by visible light is depicted in the picked up image 3, it is sufficient if the picked up image 3 includes at least an irradiation point 2*d* reflected therein. A processing unit 12 may discriminate the position of the irradiation point 2*d* reflected in the picked up image 3 as a designated position 3*a* or 3*c*. Further, the processing unit 12 may acquire a locus 3*b* or 3*d* of the designated position 3*a* or 3*c* in accordance with time variation of the designated position 3*a* or 3*c*.

The information processing apparatus 10 includes a storage unit 11 and a processing unit 12. The storage unit 11 is, for example, a memory the information processing apparatus 10 includes or a storage apparatus. The processing unit 12 is, for example, a processor the information processing apparatus 10 includes or an arithmetic operation circuit.

The storage unit 11 stores information according to an inputting behavior. For example, the storage unit 11 stores an identifier of the user 2*b* and input information 6 inputted by the user 2*b* in an associated relationship with each other. It is to be noted that, in the case where the processing unit 12 is a processor, an input information management program including a plurality of commands to be executed by the processing unit 12 are stored in the storage unit 11.

If the processing unit 12 accepts a designation operation of a range (personal use region 4) on the target 1*b* and an input of information for identifying the behavior subject of the designation operation, the processing unit 12 acquires information according to the inputting behavior within the designated range from within the information according to the detected inputting behavior. Then, the processing unit 12 stores the acquired information in an associated relationship with the information for identifying the accepted behavior subject into the storage unit 11.

For example, the processing unit 12 associates, with the input information 6 inputted by the user 2*b*, the identifier of the user 2*b* who is a creator of the input information 6. It is to be noted that, in the case where the processing unit 12 is a processor, the processing unit 12 executes the association process of the identifier of the user 2*b* with the input information 6 in accordance with the input information management program stored in the storage unit 11 and including a plurality of commands.

In the association process, the processing unit 12 first detects the designated position 3*a* in the projection image 1*c* designated by the inputting behavior of the user 2*b* to the target 1*b* on which the projection image 1*c* is displayed. The inputting behavior of the user 2*b* is, for example, a behavior of designating a position in the display region of the projection image 1*c* on the target 1*b* using the electronic pen 2*c* and drawing a character or a figure by a locus of the designated position. In this case, the processing unit 12 acquires the picked up image 3 obtained by imaging of the display region of the projection image 1*c* displayed on the target 1*b* from the camera 2*a*. Then, the processing unit 12 detects the position of the irradiation point 2*d* on the target 1*b* of a ray of light outputted from the projection image 1*c* used by the user 2*b* based on the picked up image 3 as a designated position 3*a*.

After the designated position 3*a* is detected, the processing unit 12 specifies the personal use region 4 of the user in the projection image 1*c* based on the locus 3*b* of the designated position 3*a*. For example, the processing unit 12 detects a given figure drawn by the locus 3*b* of the designated position 3*a* and specifies a region surrounded by the figure as a personal use region 4.

Then, the processing unit 12 acquires the identifier of the user 2*b* based on the locus 3*d* of the designated position 3*c* in the identifier inputting region 5 displayed on the target 1*b* in an associated relationship with the personal use region 4. For example, the user 2*b* would input its name into the personal use region 4 using the electronic pen 2*c*. Consequently, the processing unit 12 performs a hand-written character recognition process for the locus 3*d* of the designated position 3*c* to convert the locus 3*d* into a character code of the character indicative of the name of the user 2*b*.

Furthermore, the processing unit 12 acquires input information 6 by the user 2*b* based on a locus of the designated position in the personal use region 4 and stores the acquired input information 6 in an associate relationship with the acquired identifier into the storage unit 11.

The creator of the input information 6 (subject who has inputted the information) may be managed by the information processing apparatus 10 in this manner. As a result, an access right to the input information 6 from an apparatus other than the information processing apparatus 10 may be set, for example, in accordance with a will of the user 2*b* who is the creator.

For example, the processing unit 12 sets an access right to the input information 6 to an apparatus other than the information processing apparatus 10 based on the designated position in the access right setting region displayed on the target 1*b* in an associated relationship with the input information 6. In the access right setting region, for example, apparatus names of apparatus coupled to the information processing apparatus 10 by a network are displayed. The user 2*b* would select the apparatus name of an apparatus whose access is to be permitted from among the display apparatus name using the electronic pen 2*c*. For example, the user 2*b* would keep the irradiation point 2*d* of a ray of light emitted from the electronic pen 2*c* stopped for a fixed period of time on the apparatus name of the apparatus whose access is to be permitted. The processing unit 12 acquires the apparatus name displayed at the position of the irradiation point 2*d* when the irradiation point 2*d* is kept stopped for a fixed period of time and sets an access right to the input information 6 to the apparatus corresponding to the apparatus name.

The apparatus that becomes a setting target of an access right is, for example, a different computer installed in a different base from the base in which the information processing apparatus 10 is installed. By setting an access right to a computer installed in a different base, the input information 6 may be displayed in the different base.

The processing unit 12 may also set an access right to the input information 6 to a user different from the user 2*b* or to a terminal apparatus used by the different user. This makes it possible for the user 2*b* to designate, for example, whether or not the user 2*b* permits the input information 6 to be downloaded by a different user using its terminal apparatus.

Second Embodiment

Now, a second embodiment is described. The second embodiment allows, when a plurality of bases at remote locations are coupled to each other by a network to perform conference, information to be shared by the plurality of bases using the spatial UI technology.

Figure 2:
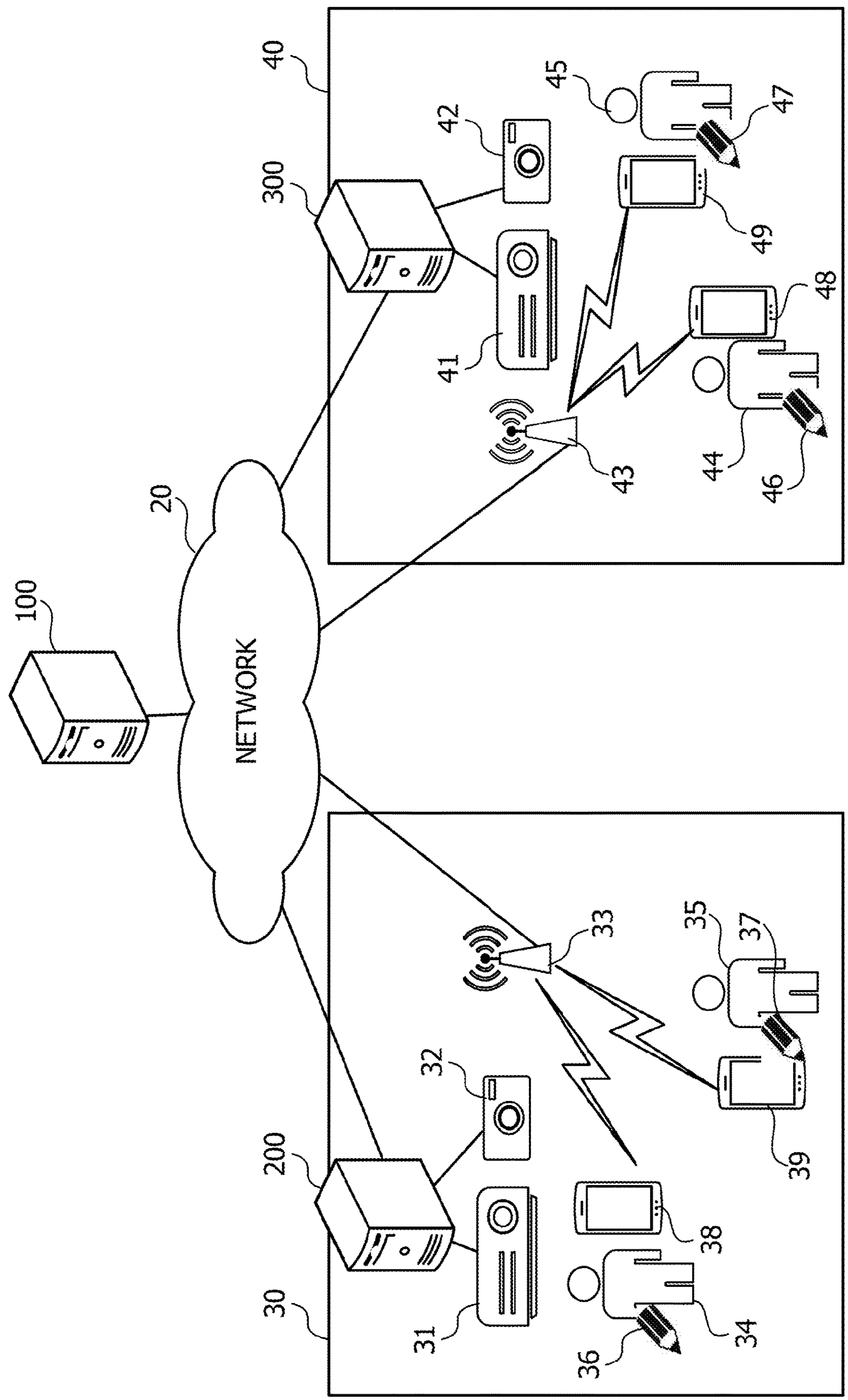
FIG. 2 is a diagram depicting an example of a system configuration of a second embodiment.

FIG. 2 is a diagram depicting an example of a system configuration of the second embodiment. Spatial UI clients 200 and 300 are installed in a plurality of bases 30 and 40, respectively.

The spatial UI client 200 is a computer that manages a virtual space defined in an overlapping relationship with a real space in the base 30 (in the inside of a conference room). To the spatial UI client 200, a projector 31 and an infrared camera 32 are coupled. The spatial UI client 200 displays an image of an object, which is disposed in the virtual space, in the real space in the base 30 by the projector 31. Further, the spatial UI client 200 images a manner of an infrared ray in the real space by the infrared camera 32 and reflects information recognized based on the picked up image in the virtual space.

The spatial UI client 300 is a computer that manages a virtual space defined in an overlapping relationship with a real space in the base 40. To the spatial UI client 300, a projector 41 and an infrared camera 42 are coupled. The spatial UI client 300 displays an image of an object, which is disposed in the virtual space, in the real space in the base 40 by the projector 41. Further, the spatial UI client 300 images a manner of an infrared ray in the real space by the infrared camera 42 and reflects information recognized based on the picked up image on the virtual space.

The spatial UI clients 200 and 300 are coupled to a place server 100 through a network 20. The place server 100 is a computer that functions as a hub that relays information between the bases 30 and 40. For example, the place server 100 synchronizes the information in the virtual spaces managed by the spatial UI clients 200 and 300 with each other. Further, the place server 100 manages information of users 34 and 35 and users 44 and 45 that perform inputting in the plurality of bases 30 and 40, respectively. Each of the spatial UI clients 200 and 300 and the place server 100 is an example of an input information management apparatus, and a spatial UI client and a place server may cooperate with each other to configure an input information management apparatus.

The plurality of users 34, 35, 44 and 45 own electronic pens 36, 37, 46 and 47 and terminal apparatuses 38, 39, 48 and 49, respectively. The electronic pens 36, 37, 46 and 47 output an infrared ray from a pen tip thereof. The terminal apparatuses 38, 39, 48 and 49 are portable computers used for communication with the place server 100. In the plurality of bases 30 and 40, access points 33 and 43 for wireless communication coupled to the network 20 are installed, respectively, and the terminal apparatuses 38 and 39 and the terminal apparatuses 48 and 49 may communicate with the place server 100 through the access points 33 and 43, respectively.

Figure 3:
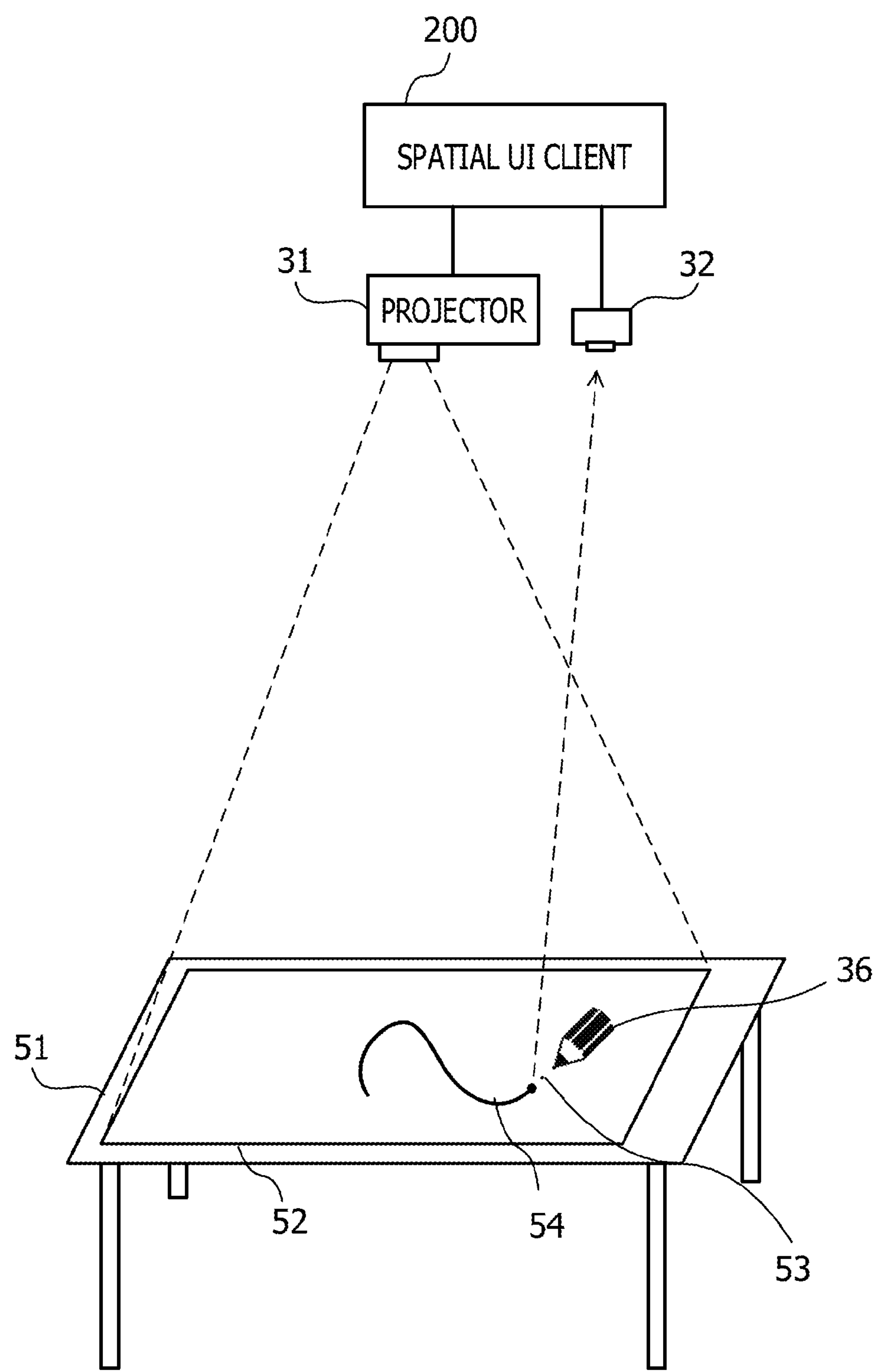
FIG. 3 is a diagram depicting an example of inputting and outputting by a spatial UI.

FIG. 3 is a diagram depicting an example of inputting and outputting by a spatial UI. In the example of FIG. 3, a projection image 52 is reflected on an upper face of the table 51 placed in the base 30 by the projector 31. A user 34 may draw a line 54, for example, within a display region (plane within a virtual space) of the projection image 52 on the table 51 using an electronic pen 36. For example, the user 34 would cause an infrared ray 53 to be outputted from the pen tip of the electronic pen 36 and move the pen tip of the electronic pen 36 so as to draw the line 54 in the display region of the projection image 52.

The inside of the display region of the projection image 52 is imaged by the infrared camera 32. The spatial UI client 200 extracts a locus of the pen tip of the electronic pen 36 from the image imaged by the infrared camera 32. For example, the spatial UI client 200 extracts a locus of movement of a point at which the luminance of the picked up image is higher than that in the surroundings (point at which the infrared ray is intense) as a locus of the pen tip. The spatial UI client 200 generates an object in the virtual space representative of the extracted locus and displays an object (line 54) generated on the table 51 by the projector 31.

Inputting and outputting by such a spatial UI are performed similarly also in the other base 40. Further, information inputted in the base 30 may be transmitted from the spatial UI client 200 to the spatial UI client 300 such that it is displayed in the virtual space in the base 30.

Figure 4:
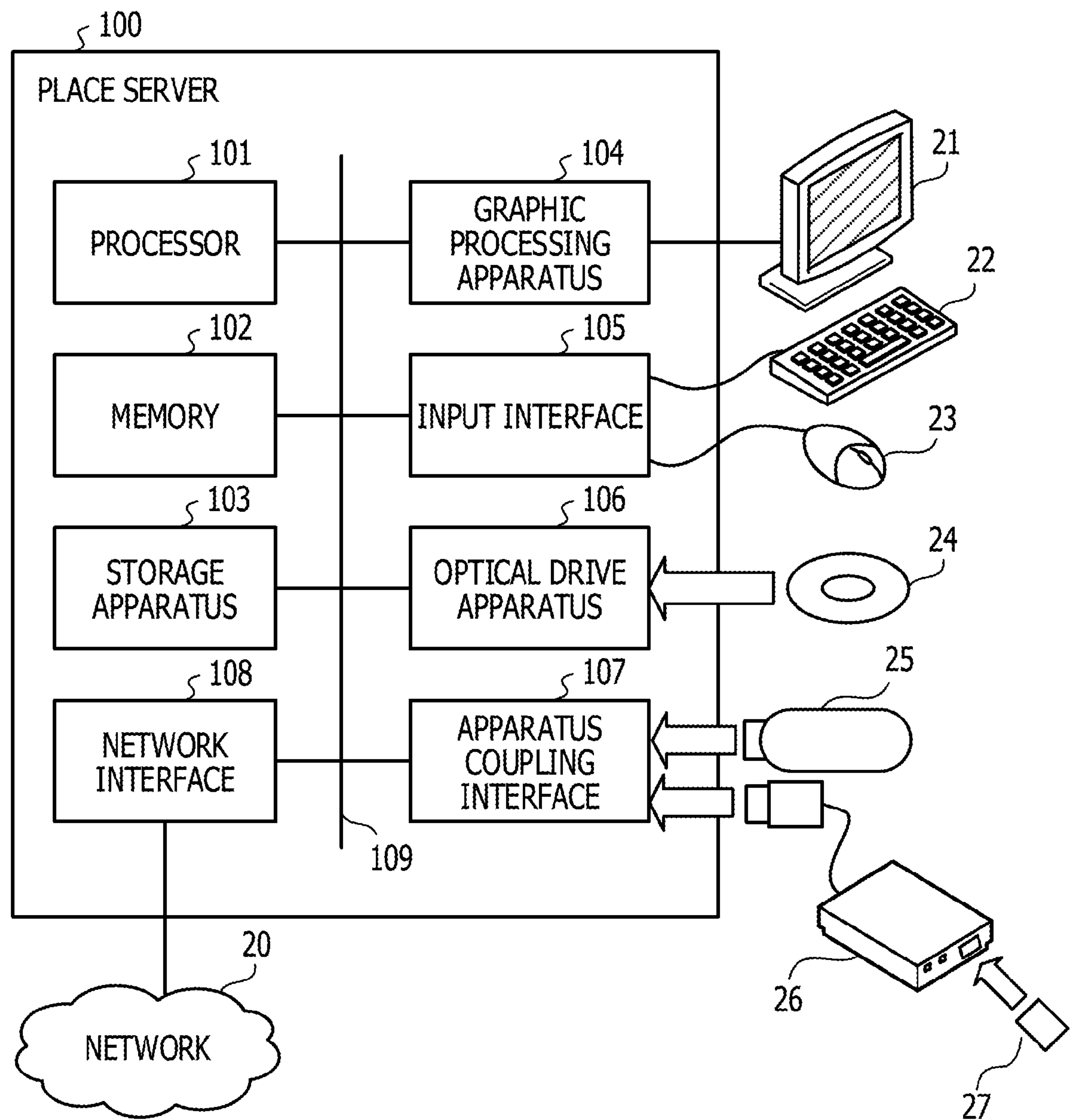
FIG. 4 is a diagram depicting a configuration example of hardware of a place server.

FIG. 4 is a diagram depicting a configuration example of hardware of a place server. The place server 100 is controlled entirely by a processor 101. To the processor 101, a memory 102 and a plurality of peripheral apparatuses are coupled through a bus 109. The processor 101 may be a multiprocessor. The processor 101 is, for example, a central processing unit (CPU), a micro processing unit (MPU) or a digital signal processor (DSP). At least part of functions implemented by execution of a program by the processor 101 may be implemented by an electronic circuit such as an application specific integrated circuit (ASIC) or a programmable logic device (PLD).

The memory 102 is used as a main storage apparatus of the place server 100. The memory 102 temporarily stores at least part of a program of an operating system (OS) or an application program to be executed by the processor 101. Further, the memory 102 stores various data to be utilized in processing by the processor 101. As the memory 102, a volatile semiconductor storage device such as a random access memory (RAM) is used.

Peripheral apparatuses are coupled to the bus 109 and include a storage apparatus 103, a graphic processing apparatus 104, an input interface 105, an optical drive apparatus 106, an apparatus coupling interface 107 and a network interface 108.

The storage apparatus 103 performs electrical or magnetic recording and reading out of data into and from a recording medium built therein. The storage apparatus 103 is used as an auxiliary storage apparatus of the computer. Into the storage apparatus 103, a program of an OS, an application program and various data are stored. It is to be noted that, as the storage apparatus 103, for example, a hard disk drive (HDD) or a solid state drive (SSD) may be used.

A monitor 21 is coupled to the graphic processing apparatus 104. The graphic processing apparatus 104 causes the monitor 21 to display an image on a screen thereof in accordance with an instruction from the processor 101. The monitor 21 may be configured from an organic electro luminescence (EL) display apparatus, a liquid crystal display apparatus or the like.

A keyboard 22 and a mouse 23 are coupled to the input interface 105. The input interface 105 transmits a signal sent thereto from the keyboard 22 or the mouse 23 to the processor 101. It is to be noted that the mouse 23 is an example of a pointing device, and also it is possible to use a different pointing device. As the different pointing device, there are a touch panel, a tablet, a touch pad, a track ball and so forth.

The optical drive apparatus 106 performs reading of data recorded on an optical disk 24 utilizing a laser beam or the like. The optical disk 24 is a portable recording medium on which data is recorded such that it may be read by reflection of light. As the optical disk 24, there are a digital versatile disc (DVD), a DVD-RAM, a compact disc read only memory (CD-ROM), a CD-recordable (R)/rewritable (RW) and so forth.

The apparatus coupling interface 107 is a communication interface for coupling a peripheral apparatus to the place server 100. For example, a memory device 25 or a memory reader/writer 26 may be coupled to the apparatus coupling interface 107. The memory device 25 is a recording medium in which a communication function with the apparatus coupling interface 107 is incorporated. The memory reader/writer 26 is an apparatus that performs writing of data into a memory card 27 or reading out of data from the memory card 27. The memory card 27 is a card type recording medium.

The network interface 108 is coupled to the network 20. The network interface 108 performs transmission and reception of data to and from a different computer or communication apparatus through the network 20.

The processing function of the second embodiment may be implemented by such a hardware configuration as described above. It is to be noted that also the spatial UI clients 200 and 300 may be implemented by hardware similar to that of the place server 100. Also the information processing apparatus 10 described in connection with the first embodiment may be implemented by hardware similar to that of the place server 100 depicted in FIG. 4.

The place server 100 implements the processing functions of the second embodiment by executing a program recorded, for example, in a computer-readable recording medium and including a plurality of commands. The program that describes the processing substance to be executed by the place server 100 may be recorded in various recording media. For example, the program to be executed by the place server 100 may be stored in the storage apparatus 103. The processor 101 loads at least part of the program in the storage apparatus 103 to the memory 102 and executes the program. Alternatively, it is possible to have the program, which is to be executed by the place server 100, recorded in a portable recording medium such as the optical disk 24, memory device 25 or memory card 27. The program stored in the portable recording medium is, for example, installed into the storage apparatus 103 and then enabled under the control of the processor 101. Also it is possible for the processor 101 to read out the program directly from the portable recording medium and execute the program.

Here, a case is supposed in which the spatial UI clients 200 and 300 are used to hold a conference in a plurality of bases 30 and 40 while information is shared by the users 34, 35, 44 and 45 as depicted in FIG. 2. At this time, if one of the users 34, 35, 44 and 45 fails to discriminate from whom information inputted using the electronic pens 36, 37, 46 and 47 is originated, such an inconvenience as described below occurs.

For example, management is disabled in regard to who is an originator of an idea originated in the conference. If the number of participants of the conference in each base is small, although users in the same base may know who has originated the idea, this is not known to the users in any other base. In the case where the number of participants is great, even the users in the same base are difficult to fully grasp in regard to all input information by whom the information has been inputted.

Further, if an originator of an idea is not known, detailed hearing regarding the idea is not possible. Furthermore, in the case where the idea is a valuable invention, if the originator of the idea is not known, it is difficult to protect the status of the originator as an originator (for example, the status as an inventor).

It is to be noted that it is possible to individually recognize the electronic pens 36, 37, 46 and 47 to specify the users of the electronic pens 36, 37, 46 and 47. For example, the electronic pens 36, 37, 46 and 47 and the spatial UI clients 200 and 300 are coupled to each other by Bluetooth (registered trademark). Although this makes it possible to specify the electronic pens 36, 37, 46 and 47 used by the individual users, it is not known from which electronic pen an infrared ray reflected on the image imaged by the infrared cameras 32 and 42 is emitted. Therefore, it is difficult to associate a locus of the irradiation point of the infrared ray and a user with each other.

Thus, also it is conceivable to cause the electronic pens 36, 37, 46 and 47 to output infrared rays of different wavelengths from each other such that a user is specified depending upon the difference in wavelength. However, it is not realistic in terms of the cost to prepare a large number of electronic pens 36, 37, 46 and 47 having different wavelengths to be outputted. In the case where the spatial UI clients 200 and 300 are configured so as to distinctly extract irradiation points of different wavelengths from a picked up image, the processing loads to the spatial UI clients 200 and 300 become excessively high.

Also it is conceivable to specify the positions of the users 34, 35, 44 and 45 utilizing the infrared cameras 32 and 42 and consider a creator of a content registered in a given range of a position of the user 34, 35, 44 or 45 as a user who is at the position. However, the infrared cameras 32 and 42 are disposed so as to looking down the upper face of the table 51 from above in order to accurately grasp the position of the electronic pen 36, 37, 46 or 47. Therefore, the face, a hand or the like that may be used for authentication of the user 34, 35, 44 or 45 is positioned between the infrared cameras 32 and 42 and the electronic pens 36, 37, 46 and 47. Besides, the users 34, 35, 44 and 45 have such a posture that the back thereof faces the infrared cameras 32 and 42. Therefore, also it is difficult for the infrared cameras 32 and 42 to recognize the users 34, 35, 44 and 45.

It is to be noted that, if a plurality of cameras (for example, cameras for imaging visible rays) are disposed in one base and perform imaging from various directions, it is possible to individually recognize the users 34, 35, 44 and 45 by face recognition. However, it is difficult in terms of the cost to prepare a plurality of cameras only in order to grasp the position of the users 34, 35, 44 and 45 utilizing the spatial UI. Besides, the spatial UI clients 200 and 300 come to analyze images imaged by the plurality of cameras, and this makes the processing burden on the spatial UI clients 200 and 300 excessively heavy.

Therefore, in the second embodiment, information inputted using the electronic pen 36, 37, 46 or 47 and a user who inputs the information are associated with each other without using excessive equipment and without imposing an excessively heavy processing burden on the spatial UI clients 200 and 300.

In the following, functions the place server 100 and the spatial UI clients 200 and 300 have for associating information inputted using the electronic pen 36, 37, 46 or 47 and a user who inputs the information with each other is described.

Figure 5:
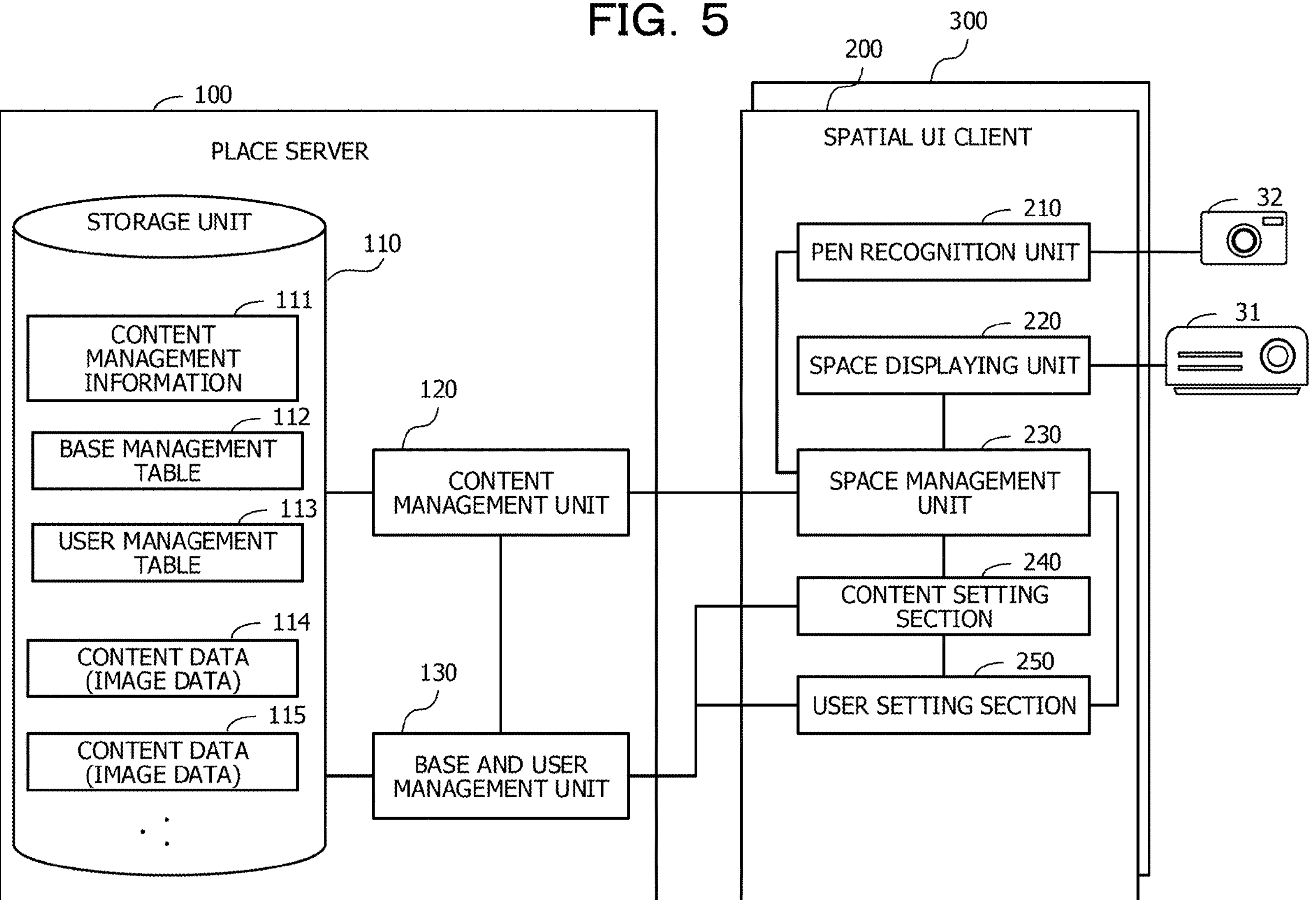
FIG. 5 is a block diagram depicting an example of functions of individual apparatus.

FIG. 5 is a flock diagram depicting an example of functions of an individual apparatus. The place server 100 includes a storage unit 110, a content management unit 120 and a base and user management unit 130.

The storage unit 110 stores content management information 111, a base management table 112, a user management table 113, and a plurality of content data 114, 115, . . . . The storage unit 110 is, for example, part of the storage area of the memory 102 or the storage apparatus 103. The content management information 111 is information relating to a creator of a content, presence or absence of display of the content in each base, an access right to the content for each user and so forth. The base management table 112 is information relating to a spatial UI client set to a base. The user management table 113 is information relating to a user who registers a content using an electronic pen. The content data 114, 115, . . . are particular data (for example, image data) regarding a content indicated by the content management information 111.

In the following, the content management information 111, base management table 112 and user management table 113 are described in detail with reference to FIGS. 6 to 8.

FIG. 6 is a diagram depicting an example of content management information. In the example of FIG. 6, information relating to a content to be displayed in a virtual space is described in the JavaScript (registered trademark) object notation (JSON) format in the content management information 111.

In the key "place" of the content management information 111, the name of the base (base name) in which the content is disposed is set. In the key "ip-address," the internet protocol (IP) address of the spatial UI client of the base in which the content is disposed is set. In the key "Contents," information of the disposed content is set.

In the key "id" indicated in the key "Contents," an identifier of the content is set. In the key "Author," the name of a creator of the content is set. In the key "type," a type of the content is set. In the key "data," information indicative of an object to be displayed as the content is set. For example, in the case where an image is to be displayed, position information of content data that is image data of the image is set by the key "imagepath." In the key "coordinates," the display position of the content in a display region set in a virtual space is set. In the key "size," a width and a height when the content is to be displayed are set.

In the key "security," management information such as an access right to the content is set. For example, by the key "users," an access right of a specific user is set. To the key "userId," the identifier of a user of a setting target of the access right is set. To the key "username," the user name of the pertinent user is set. To the key "permission," the substance of the right given to the pertinent user is set. For example, if the value of the key "fullcontrole" is "true," the user has a right for update (including change and deletion of the substance), reference and writing (addition of data). If the value of the key "update" is "true," the user has the right for update. If the value of the key "read" is "true," the user has the right for reference. If the value of the key "write" is "true," the user has the right for writing. For example, if the user has the right for reference to the content, the user may download the content to a terminal apparatus owned by the user.

It is to be noted that, while, in the example of FIG. 6, the access right to the user is set as the value of the key "security," the access right to the spatial UI clients 200 and 300 may be set in a similar form. For example, to a content whose display is permitted to a different base, the access right indicative of permission of reference is set in an associated relationship with the base name or the IP address of the base.

Figure 7:
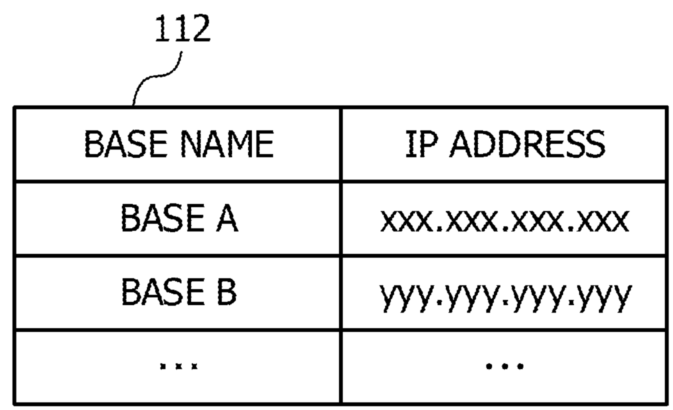
FIG. 7 is a diagram depicting an example of a base management table.

FIG. 7 is a diagram depicting an example of a base management table. In the base management table 112, an IP address of a spatial UI client disposed in a base is set in an associated relationship with a base name of the base.

FIG. 8 is a diagram depicting an example of a user management table. In the user management table 113, a password of a user is set in an associated relationship with a user identifier (ID) of the user. The password is a character string or a pattern indicative of a selection order of dots on a screen image. In the example of FIG. 8, an example in which a password is set as a pattern is depicted. It is to be noted that, in FIG. 8, the order in which dots are to be traced is indicated by an arrow mark. Also in the case where a pattern of a selection order of dots is used as a password, on data, an array of symbols indicative of the selected dots is registered as a password into the user management table 113.

Description is given referring back to FIG. 5.

The content management unit 120 acquires contents set in a virtual space in each of the spatial UI clients 200 and 300. Then, the content management unit 120 stores the acquired contents into the storage unit 110. Further, in the case where the acquired contents are permitted to be displayed in a base different from the base of the transmission source of the content, the content management unit 120 transmits the content to the spatial UI client of the base for which display of the content is permitted.

The base and user management unit 130 manages the base management table 112 and the user management table 113. For example, the base and user management unit 130 adds a record to the base management table 112 or the user management table 113 in response to a request from the spatial UI client 200 or 300. Further, the base and user management unit 130 acquires a base name or a user ID from the base management table 112 or the user management table 113 in response to a request from the spatial UI client 200 or 300 and transmits the base name or user ID to the spatial UI client 200 or 300.

The spatial UI client 200 includes a pen recognition unit 210, a space displaying unit 220, a space management unit 230, a content setting section 240 and a user setting section 250.

The pen recognition unit 210 detects an irradiation position of an infrared ray outputted from the electronic pen 36 or 37 based on an image of an infrared ray imaged by the infrared camera 32. Then, the pen recognition unit 210 generates an object indicative of a locus of the irradiation position of the infrared ray. The pen recognition unit 210 transmits the generated object to the space management unit 230.

The space displaying unit 220 acquires information of a virtual space from the space management unit 230 and generates a projection image 52 including the object of the display target in the virtual space. Then, the space displaying unit 220 displays the generated projection image 52 at a given position in the base 30 (for example, on an upper face of the table 51) through the projector 31.

The space management unit 230 manages the virtual space defined in the base 30. For example, the space management unit 230 sets an object acquired from the pen recognition unit 210 to a plane in a virtual space coincident with the upper face of the table 51. Further, in the case where it is designated from the content setting section 240 that the displayed object is a content, the space management unit 230 recognizes the object as a content of a management target. The space management unit 230 transmits content information indicative of the content in the virtual space to the content management unit 120 of the place server 100. The content information includes content data (for example, image data) indicative of the substance of the content and information indicative of a display position and a display size of the content. On the other hand, if content information indicative of a content set by the different base 40 is received from the content management unit 120, the space management unit 230 sets the content of the different base 40 in the virtual space.

The content setting section 240 recognizes a setting region of a content based on an object set in a virtual space and sets the object set in the setting region as a content to the virtual space. For example, if a quadrangular object is set in the virtual space, the content setting section 240 recognizes the inside of the object as a setting region of the content.

Further, the content setting section 240 recognizes a personal space based on the object set in the virtual space. It is to be noted that the personal space is an example of the personal use region 4 (refer to FIG. 1) indicated in the first embodiment. For example, if an object of a shape of the alphabet "P" is set in the virtual space, the content setting section 240 recognizes a portion surrounded by the contour line of "P" as a personal space. In the case where a personal space is set, the content setting section 240 accepts setting of a user who uses the personal space by the user setting section 250. In the case where a content is set in the personal space, the content setting section 240 sets user information of the user who uses the personal space to the content.

Furthermore, the content setting section 240 sets, to a content, an access right to the content from the spatial UI client 300 of the different base 40 or the terminal apparatus 38, 39, 48, or 49 owned by the user 34, 35, 44, or 45.

The user setting section 250 performs user registration into the place server 100 and an association process of a user with a personal space. For example, if an object of a shape of the alphabet "R" is set in the virtual space, the user setting section 250 recognizes that a user registration request is issued and sets a user information inputting object in the virtual space. Consequently, the user information inputting object is displayed, for example, on the table 51 by the space displaying unit 220. Then, the user setting section 250 recognizes user information based on an input by an electronic pen into the user information inputting object. The user setting section 250 transmits the recognized user information to the base and user management unit 130 of the place server 100.

Further, when the content setting section 240 recognizes a personal space, the user setting section 250 sets a user information inputting object for a user who uses the personal space in the virtual space. Consequently, the user information inputting object is displayed, for example, on the table 51 by the space displaying unit 220. The user setting section 250 acquires user information based on an input by an electronic pen into the user information inputting object. Then, the user setting section 250 confirms that a user corresponding to the user information is registered in the place server 100 and notifies, in the case where the user is registered, the content setting section 240 of the user ID of the user as a user ID of the user of the personal space.

It is to be noted that the functions of the elements depicted in FIG. 5 may be implemented, for example, by causing a computer to execute program modules corresponding to the elements.

In the following, a management process of contents using the spatial UI is described in detail. First, a user registration method is described.

Figure 9:
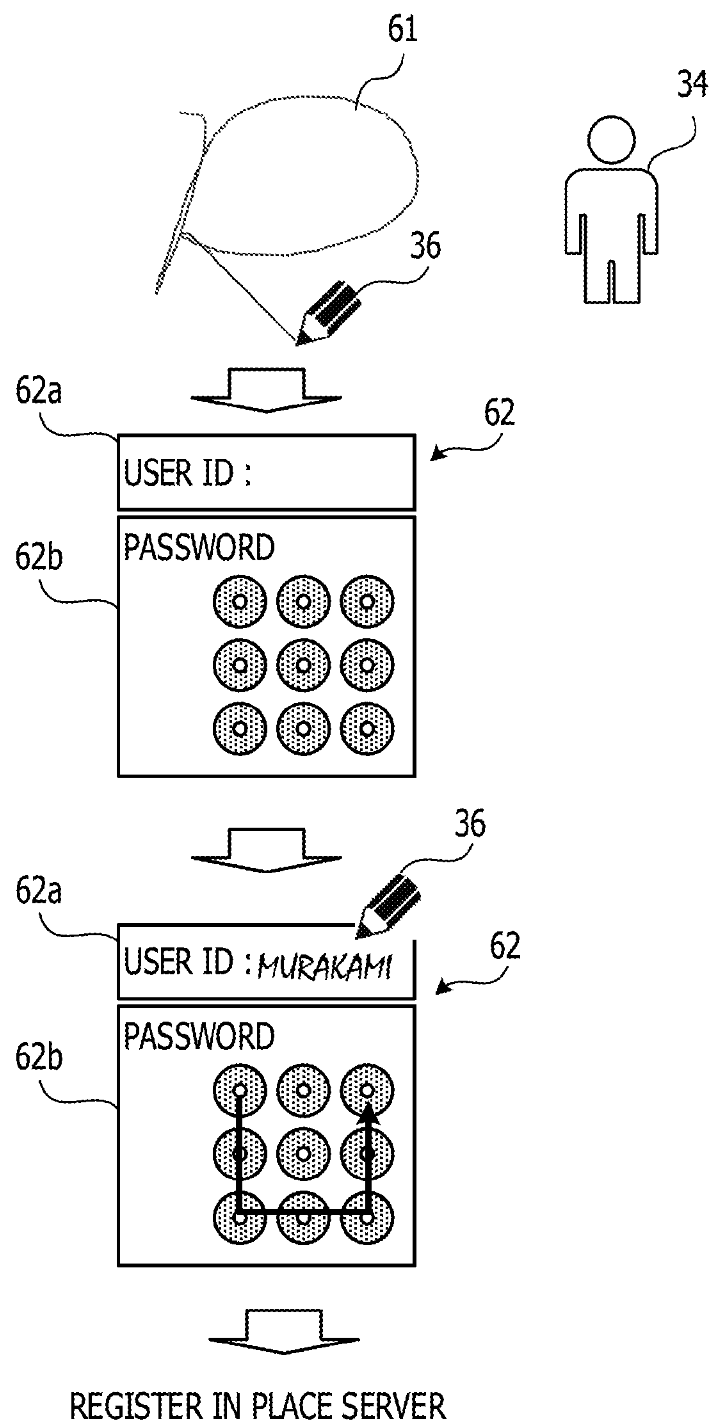
FIG. 9 is a diagram depicting an example of a user registration method.

FIG. 9 is a diagram depicting an example of a user registration method. For example, a user 34 who tries to perform user registration draws a FIG. 61 for user registration (in the example of FIG. 9, the character "R") on the table 51 using the electronic pen 36. Consequently, an object 62 for user information inputting is reflected on the table 51. It is to be noted that the object 62 for user information inputting is an example of the identifier inputting region 5 (refer to FIG. 1) in the first embodiment. The object 62 for user information inputting includes a user ID setting part 62*a* and a password setting part 62*b*. In the password setting part 62*b*, a pattern of dots for password inputting is displayed.

The user 34 fills out its user ID into the user ID setting part 62*a* using the electronic pen 36. For example, the user 34 fills out the name of the user 34 itself as a user ID into the user ID setting part 62*a*. Then, the user 34 inputs its password by tracing the pattern of dots displayed in the password setting part 62*b* using the electronic pen 36. The set of the user ID and the password inputted by the user 34 is registered as user information of the user 34 into the place server 100.

Figure 10:
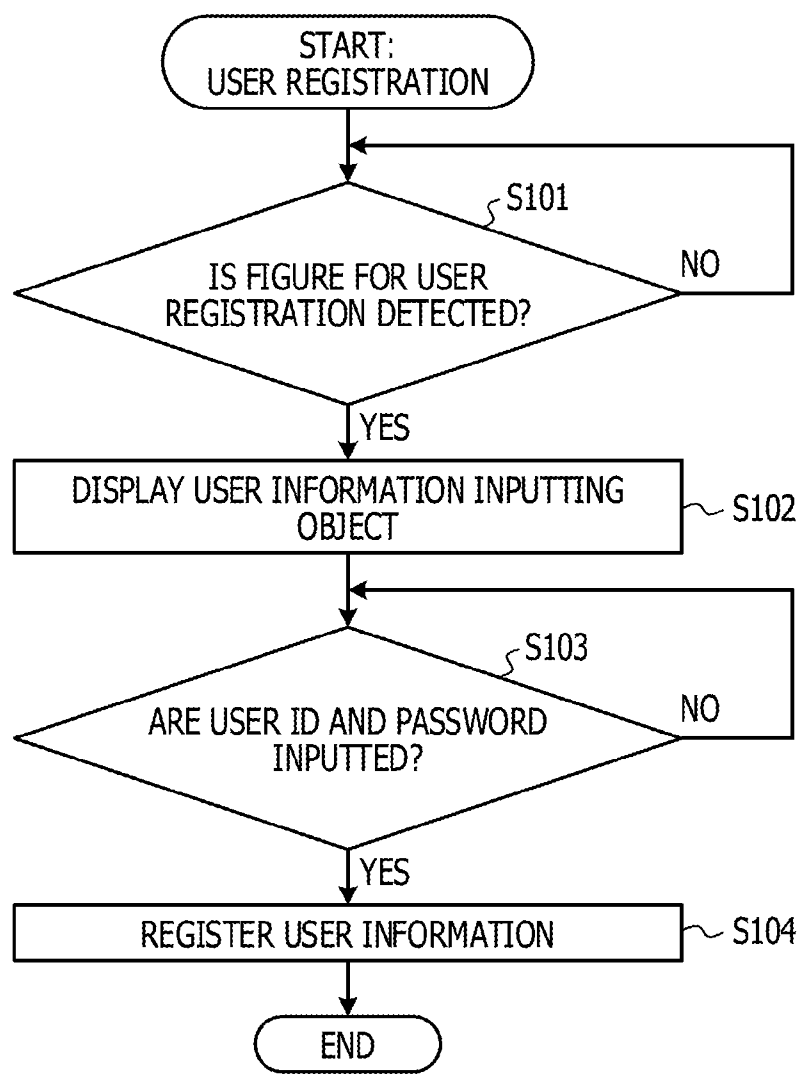
FIG. 10 is a flow chart depicting an example of a procedure of a user registration process.

FIG. 10 is a flow chart depicting an example of a procedure of a user registration process. In the following, the process depicted in FIG. 10 is described in accordance with step numbers.

[Step S101] The user setting section 250 decides whether or not a FIG. 61 for user registration is detected in a virtual space. In the case where a FIG. 61 for user registration is detected, the user setting section 250 advances its processing to step S102. On the other hand, if a FIG. 61 for user registration is not detected, the user setting section 250 repeats the process at step S101.

[Step S102] The user setting section 250 causes an object 62 for user information inputting to be displayed. For example, the user setting section 250 sets an object 62 for user information inputting in the virtual space managed by the space management unit 230. Consequently, a projection image including the object 62 for user information inputting is displayed on the upper face of the table 51 through the projector 31 by the space displaying unit 220.

[Step S103] The user setting section 250 decides whether or not a user ID and a password are inputted. In the case where a user ID and a password are inputted, the user setting section 250 advances the processing to step S104. On the other hand, if inputting of a user ID and a password is not completed, the user setting section 250 repeats the process at step S103.

[Step S104] The user setting section 250 registers the set of the inputted user ID and password as user information into the place server 100. For example, the user setting section 250 transmits a user information registration request including the user ID and the password to the place server 100. In the place server 100, the base and user management unit 130 receives the user information registration request. Then, the base and user management unit 130 additionally registers a record including the set of the user ID and the password indicated in the received user information registration request as user information into the user management table 113 of the storage unit 110.

The user information of the user 34 is registered into the place server 100 in such a manner as described above. The user 34 who has performed the user registration may set a personal space for the user 34 in the virtual space.

Now, a setting method of a personal space is described.

Figure 11:
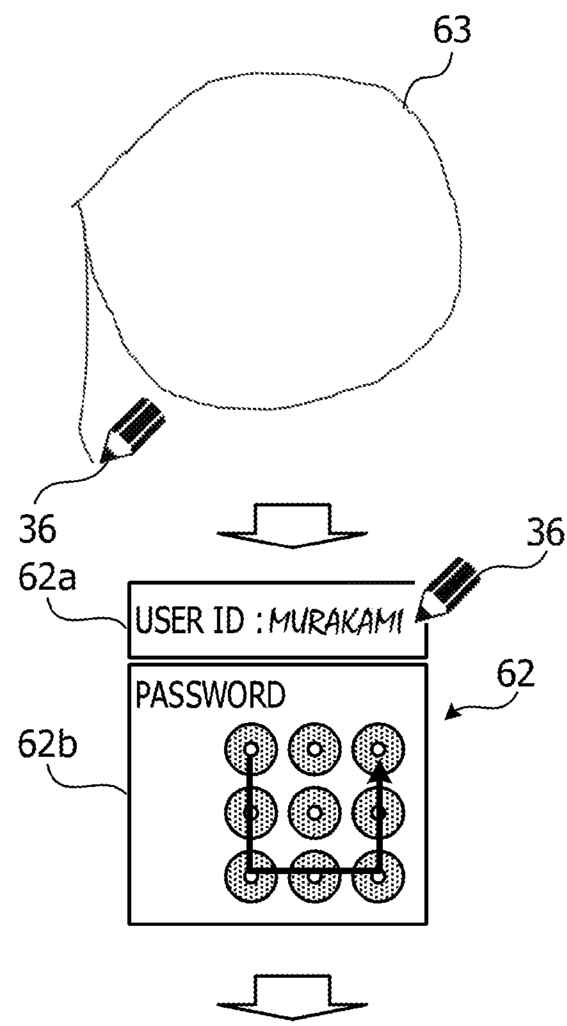
FIG. 11 is a diagram depicting an example of a setting method of a personal space.
Figure 11:
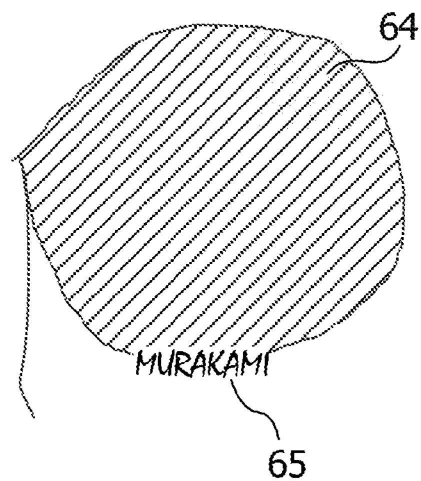

FIG. 11 is a diagram depicting an example of a setting method of a personal space. For example, the user 34 who tries to perform user registration draws a FIG. 63 for personal space generation (in the example of FIG. 11, the character "P") on the table 51 using the electronic pen 36. Consequently, the object 62 for user information inputting is reflected on the table 51.

The user 34 fills out the user ID setting part 62*a* of the object 62 for user information inputting with the user ID using the electronic pen 36. Then, the user 34 inputs its password by tracing a pattern of dots displayed on the password setting part 62*b* of the object 62 for user information inputting with the electronic pen 36 similarly as upon user registration. The set of the user ID and the password inputted by the user 34 becomes user information for authentication. The user setting section 250 requests the place server 100 for user authentication with the user information for authentication. In the case where the authentication results in success, the user setting section 250 notifies the content setting section 240 of the user ID.

The content setting section 240 receiving the notification of the user ID sets a region surrounded by the FIG. 63 for personal space generation to a personal space 64 for the user corresponding to the user ID. At this time, the content setting section 240 sets, for example, the background color in the personal space 64 to a color different that in the other region. Then, the content setting section 240 sets the user ID to the personal space 64. As a result, the background is changed, and the personal space 64 to which the user ID 65 is given is displayed on the table 51.

Figure 12:
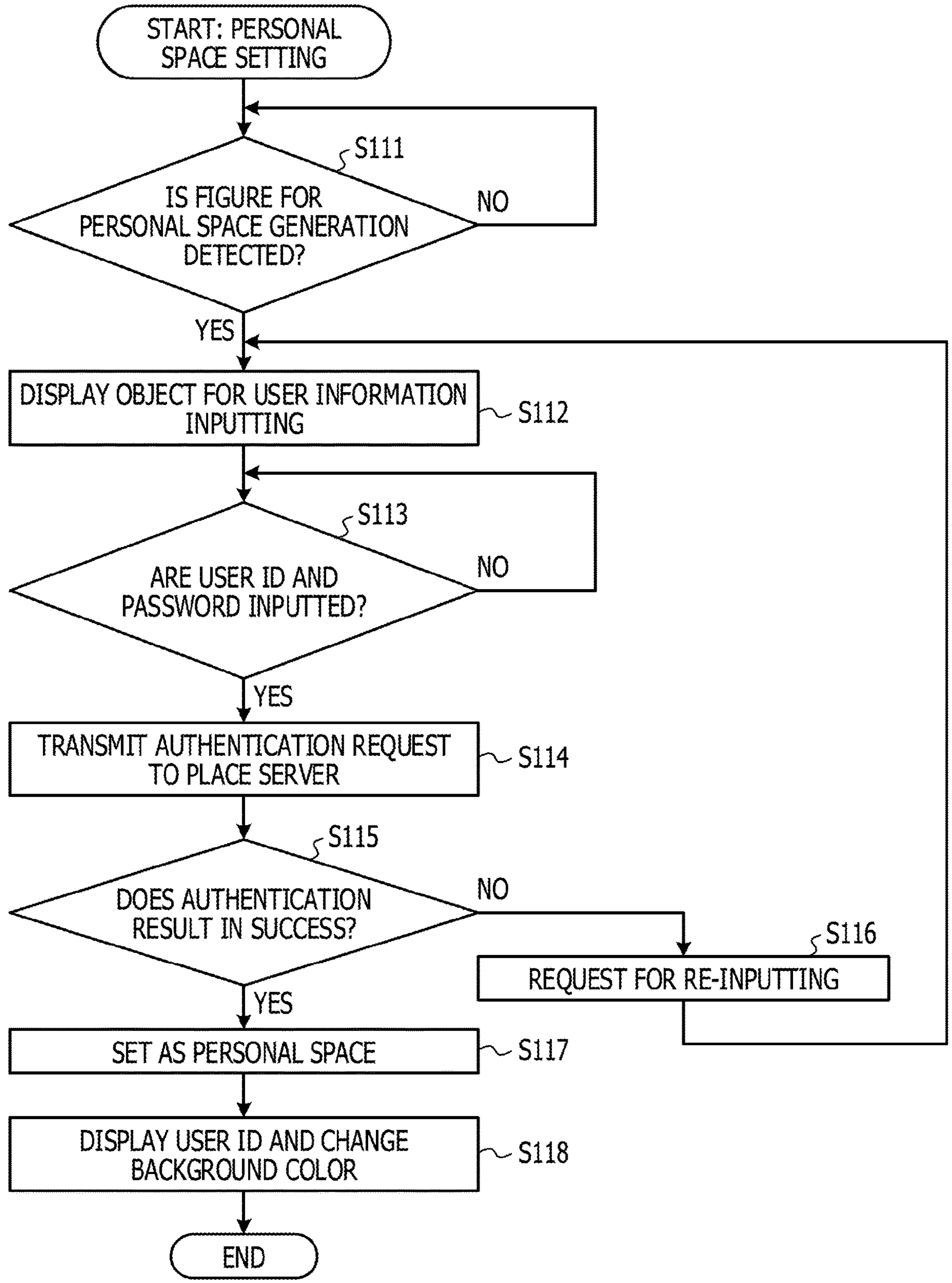
FIG. 12 is a flow chart depicting an example of a procedure of a personal space setting process.

FIG. 12 is a flow chart depicting an example of a procedure of a personal space setting process. In the following, the process depicted in FIG. 12 is described in accordance with step numbers.

[Step S111] The content setting section 240 decides whether or not a FIG. 63 for personal space generation is detected in the virtual space. In the case where a FIG. 63 for personal space generation is detected, the content setting section 240 transmits an acquisition request for a user ID to the user setting section 250 and advances its processing to step S112. On the other hand, if a FIG. 63 for personal space generation is not detected, the user setting section 250 repeats the process at step S111.

[Step S112] The user setting section 250 causes an object 62 for user information inputting to be displayed in response to the acquisition request for a user ID. For example, the user setting section 250 sets an object 62 for user information inputting in the virtual space managed by the space management unit 230. Consequently, a projection image including the object 62 for user information inputting is displayed on the upper face of the table 51 through the projector 31 by the space displaying unit 220.

[Step S113] The user setting section 250 decides whether or not a user ID and a password are inputted. In the case where a user ID and a password are inputted, the user setting section 250 advances the processing to step S114. If inputting of a user ID and a password is not completed, the user setting section 250 repeats the process at step S113.

[Step S114] The user setting section 250 transmits an authentication request including the set of the inputted user ID and password to the place server 100. In the place server 100, the base and user management unit 130 receives the authentication request. Then, in the case where the user information included in the authentication request coincides with user information stored in advance in the storage unit 110, the base and user management unit 130 authenticates the user 34 as a legal user. The base and user management unit 130 transmits a result of the authentication to the user setting section 250.

[Step S115] The user setting section 250 decides whether or not the authentication results in success. For example, in the case where a response of success in authentication is received from the place server 100, the user setting section 250 decides that the authentication results in success. In the case where the authentication results in success, the user setting section 250 advances the processing to step S117. On the other hand, in the case where the authentication results in failure, the user setting section 250 advances the processing to step S116.

[Step S116] The user setting section 250 causes a message for requesting re-inputting of a user ID and a password to be displayed in a projection image 52 on the table 51. Thereafter, the user setting section 250 advances the processing to step S112.

[Step S117] The user setting section 250 transmits the user ID to the content setting section 240. The content setting section 240 sets a region surrounded by the FIG. 63 for personal space generation as a personal space 64 for a user corresponding to the inputted user ID.

[Step S118] The content setting section 240 causes the user ID 65 to be displayed in the personal space 64 and changes the background color of the personal space 64.

The personal spaces 64 for individual users may be set in the projection image 52 in this manner. Thereafter, to a content set in the personal space 64, the user ID of the user who uses the personal space 64 is set as a creator.

Figure 13:
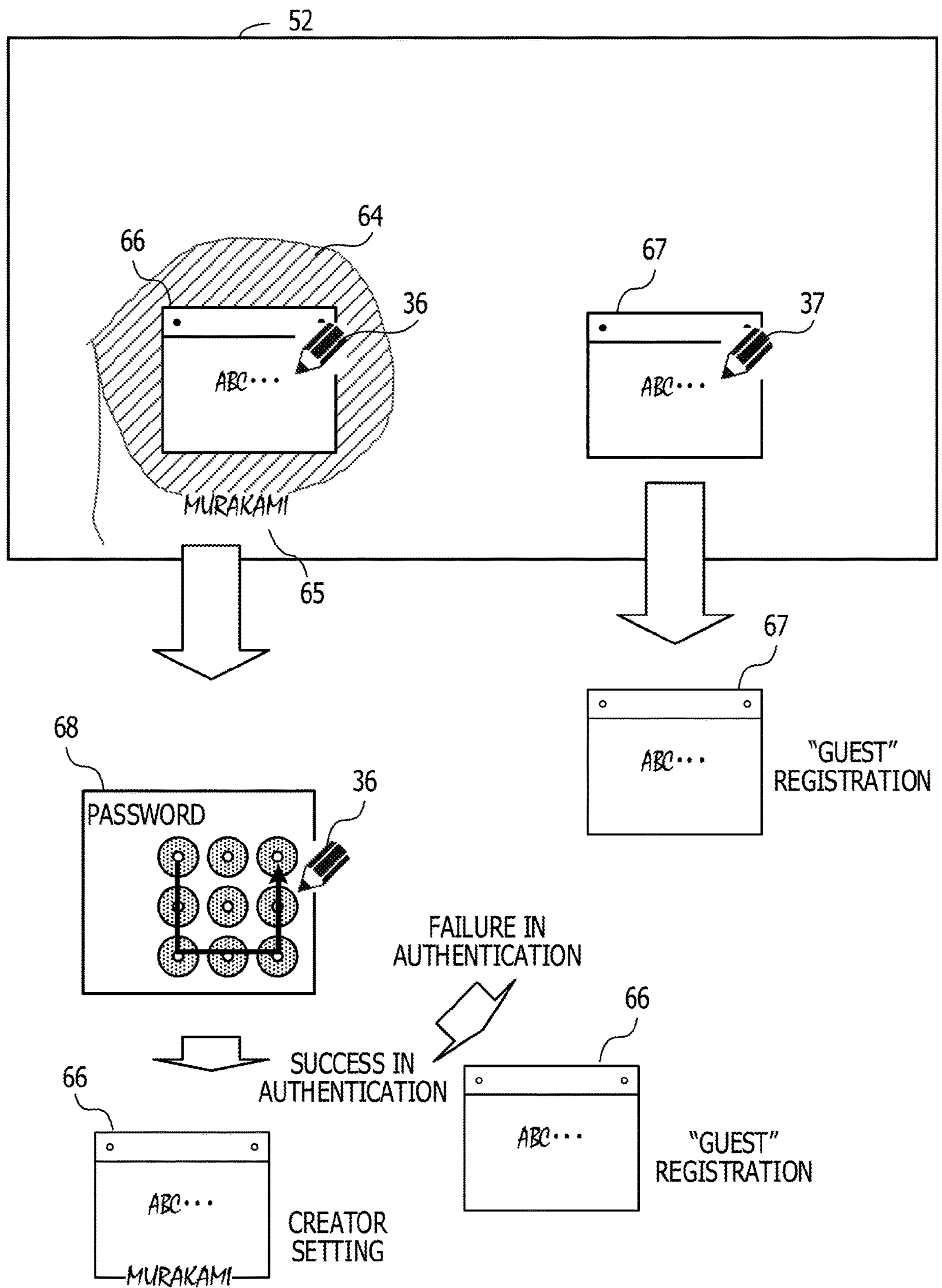
FIG. 13 is a diagram depicting an example of content setting.

FIG. 13 is a diagram depicting an example of content setting. FIG. 13 depicts handling of contents in a case where a content inputting region 66 is set in a personal space 64 and in another case where a content inputting region 67 is set outside the personal space 64.

For example, if the user 34 draws a rectangle in the personal space 64 using the electronic pen 36, the region is set as a content inputting region 66. The user 34 writes a character in the content inputting region 66 using the electronic pen 36. The written character is recognized as an object by the pen recognition unit 210. Since the recognized object is within the content inputting region 66, the content setting section 240 sets the object as a content in the virtual space.

In the case where the content inputting region 66 is set in the personal space 64, an object 68 for password inputting is set in the virtual space by the user setting section 250. The object 68 for password inputting is displayed in the projection image 52 by the space displaying unit 220. The user 34 inputs a password to the object 68 for password inputting using the electronic pen 36. The inputted password is transmitted to the place server 100 together with the user ID set in the personal space 64 by the user setting section 250. In the place server 100, the base and user management unit 130 performs an authentication process based on the set of the received user ID and password. Then, the base and user management unit 130 transmits a result of the authentication to the user setting section 250.

In the case where the authentication results in success, the user setting section 250 sets the user ID 65 set in the personal space 64 as a user ID of the creator of the content to the content. On the other hand, in the case where the authentication results in failure, the user setting section 250 registers the creator of the content as "guest." In regard to the content whose creator is "guest," an access right for reference and so forth is given, for example, to all users.

Here, it is assumed that, for example, the user 35 sets a content inputting region 67 to the outside of the personal space 64 using the electronic pen 37. In this case, the user setting section 250 registers the creator of the content set in the content inputting region 67 as "guest" without issuing a request for inputting of a password.

In this manner, the user ID of the creator may be set to the content set in the personal space 64. For example, the creator of the content may be managed. As the creator is managed, for example, an access right to the content to be provided to the spatial UI client 200 or 300 or the user 34, 35, 44 or 45 may be set in accordance with a will of the creator.

Figure 14:
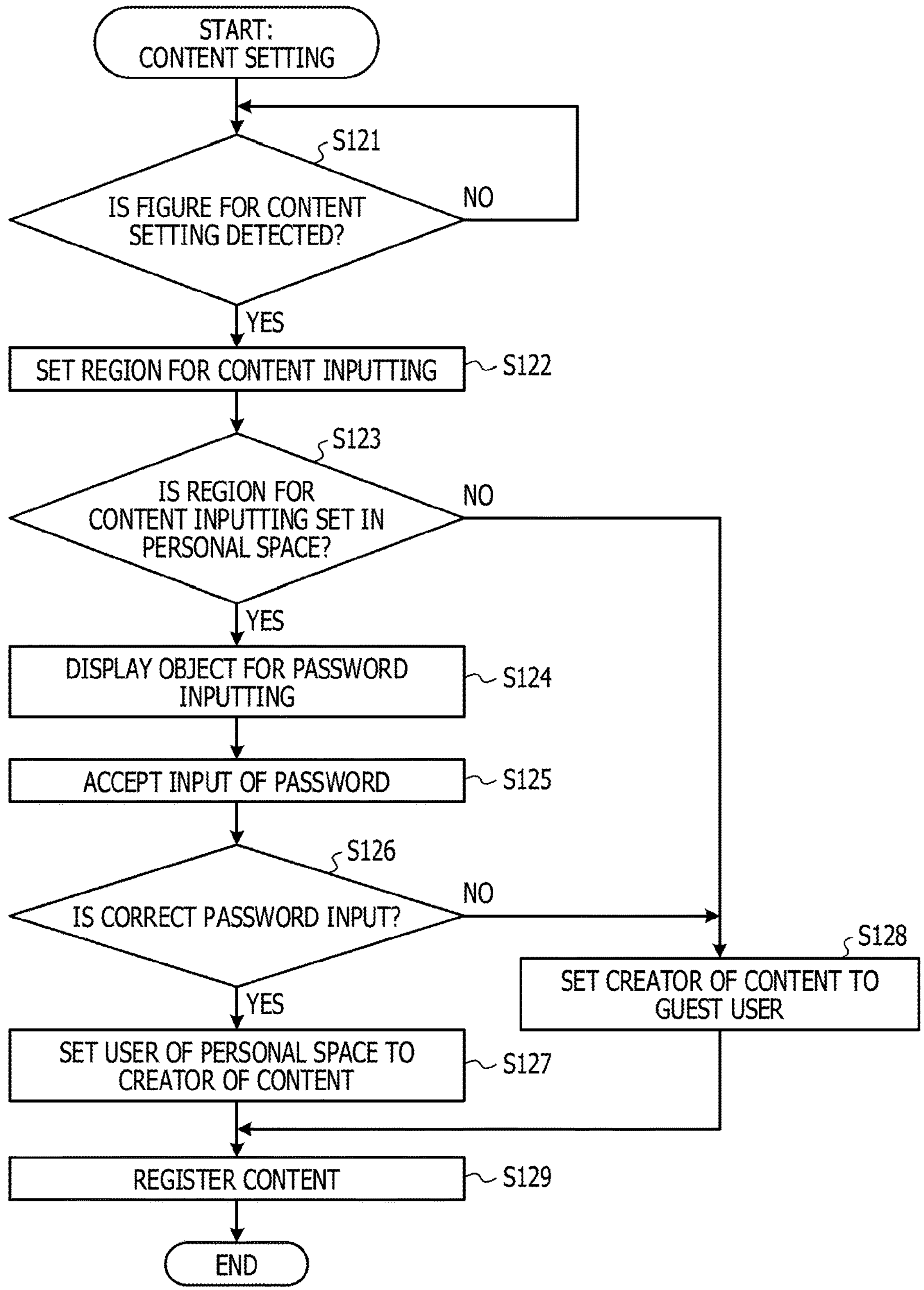
FIG. 14 is a flow chart depicting an example of a procedure of a content setting process.

FIG. 14 is a flow chart depicting an example of a procedure of a content setting process. In the following, the process depicted in FIG. 14 is described in accordance with step numbers.

[Step S121] The content setting section 240 decides whether or not a figure for content setting is detected in the virtual space. The figure for content setting is, for example, a quadrangular figure. In the case where a figure for content setting is detected, the content setting section 240 advances its processing to step S122. On the other hand, if a figure for content setting is not detected, the content setting section 240 repeats the process at step S121.

[Step S122] The content setting section 240 sets the region in the figure for content setting as content inputting regions 66 and 67. For example, the content setting section 240 adds objects indicative of the content inputting regions 66 and 67 (for example, quadrangular objects) to the virtual space managed by the space management unit 230. The objects indicative of the content inputting regions 66 and 67 are displayed on the upper face of the table 51 by the space displaying unit 220.

[Step S123] The content setting section 240 decides whether or not the set positions of the content inputting regions 66 and 67 are within the personal space 64. In the case where the set positions of the content inputting regions 66 and 67 are within the personal space 64, the processing is advanced to step S124. On the other hand, in the case where the set positions of the content inputting regions 66 and 67 are outside the personal space 64, the content setting section 240 advances the processing to step S128.

[Step S124] The user setting section 250 causes an object 68 for password inputting to be displayed. For example, the user setting section 250 adds an object 68 for password inputting (for example, an object in which dots for password inputting are arranged) to the virtual space managed by the space management unit 230. The added object is displayed on the upper face of the table 51 by the space displaying unit 220.

[Step S125] The user setting section 250 accepts an input of a password to the object 68 for password inputting.

[Step S126] The user setting section 250 decides whether or not a correct password is inputted. For example, the user setting section 250 transmits an authentication request including a set (user information) of the user ID set in the personal space 64, to which the content is added, and the inputted password to the place server 100. In the place server 100, the base and user management unit 130 decides whether or not user information coincident with the user information indicated by the authentication request is registered in the user management table 113. If coincident user information is registered in the user management table 113, the base and user management unit 130 issues a response that the authentication results in success to the user setting section 250. In the case where the response that the authentication results in success is received, the user setting section 250 decides that the password is correct. In the case where the correct password is inputted, the user setting section 250 notifies the content setting section 240 that the user authentication results in success, and advances the processing to step S127. On the other hand, if the password is not correct, the user setting section 250 advances the processing to step S128.

[Step S127] The content setting section 240 sets the user ID 65 of the user of the personal space 64 a creator of the content to be inputted into the content inputting region 66. At this time, the content setting section 240 sets, for example, to the content, an access right to the content by the content creator. For example, the content setting section 240 performs setting of an access right such that accessing of all types is permitted. Thereafter, the content setting section 240 advances the processing to step S129.

[Step S128] The content setting section 240 sets the creator of the content to be inputted into the content inputting regions 66 and 67 to the guest user.

[Step S129] The content setting section 240 detects the content inputted in the content inputting regions 66 and 67 and registers the content into the virtual space managed by the space management unit 230. Along with this, the content setting section 240 adds the information of the creator set at step S127 or S128 to the set content. After the content is registered into the virtual space, information indicative of the content is transmitted to the place server 100 by the space management unit 230. In the place server 100, the content management unit 120 receives the information indicative of the content and stores the information into the storage unit 110. For example, the content management unit 120 updates the content management information 111 based on the received information. Further, in the case where image data is included in the received information, the content management unit 120 stores the image data as content data into the storage unit 110.

Figure 15:
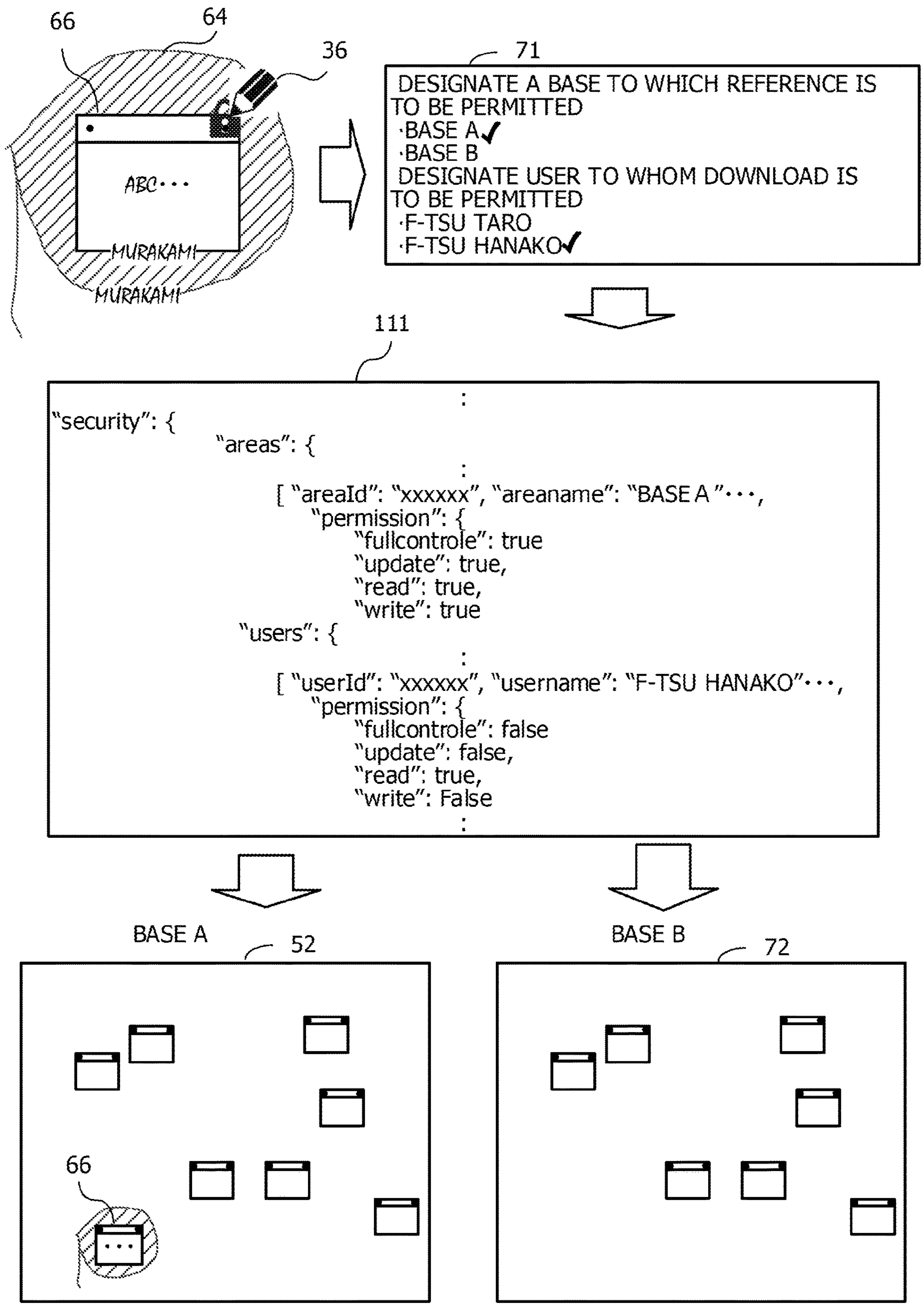
FIG. 15 is a diagram depicting an example of setting of an access right to a content.

FIG. 15 is a diagram depicting an example of setting of an access right to a content. For example, if the user 34 performs a selection operation of the content inputting region 66 using the electronic pen 36, an object of an access right setting dialog 71 is set to the virtual space by the content setting section 240. Consequently, an access right setting dialog 71 is displayed. In the access right setting dialog 71, for example, base names of bases to which the system is coupled and user IDs of users whose terminal apparatus for downloading is registered are displayed. For example, the content setting section 240 transmits an acquisition request for base names in the base management table 112 and user IDs in the user management table 113 to the base and user management unit 130. The base and user management unit 130 acquires the base names in the base management table 112 and the user names in the user management table 113 from the storage unit 110 and transmits the acquired base names and user names to the content setting section 240. The content setting section 240 generates an object of an access right setting dialog 71 including the received base names and user names and sets the object to the virtual space managed by the space management unit 230. Consequently, a projection image including the set access right setting dialog 71 is displayed, for example, on the upper face of the table 51 by the space displaying unit 220.

The user 34 selects a base name of a base to which reference is to be permitted using the electronic pen 36. In the example of FIG. 15, "base A" is selected. To the selected base name, for example, a check mark is displayed. Further, the user 34 selects a user name of a user to whom downloading is to be permitted using the electronic pen 36. In the example of FIG. 15, "F-TSU Hanako" is selected. To the selected user name, for example, a check mark is displayed.

If a base name or a user name is selected, the content setting section 240 adds setting information of an access right relating to the selected base or user in the content management information 111. Note that it is assumed that, in the case where the base for which the content inputting region 66 is created is "base A," as an initial state, the key "fullcontrole" is set to "true" for "base A."

In the example of FIG. 15, to the "base A," reference to the content in the content inputting region 66 is permitted. Therefore, in the projection image 52 of the "base A," the content in the content inputting region 66 is included. However, to the "base B," reference to the content in the content inputting region 66 is not permitted. Therefore, a projection image 72 of the "base B" does not include the content inputting region 66 and the content in the content inputting region 66.

In this manner, each content set in the virtual space is displayed only by a spatial UI client having an access right. Consequently, to which base a registered content is to be laid open may be set arbitrarily by a creator of the content.

Further, by setting of an access right to a content, downloading of the content may be permitted only to part of users.

Figure 16:
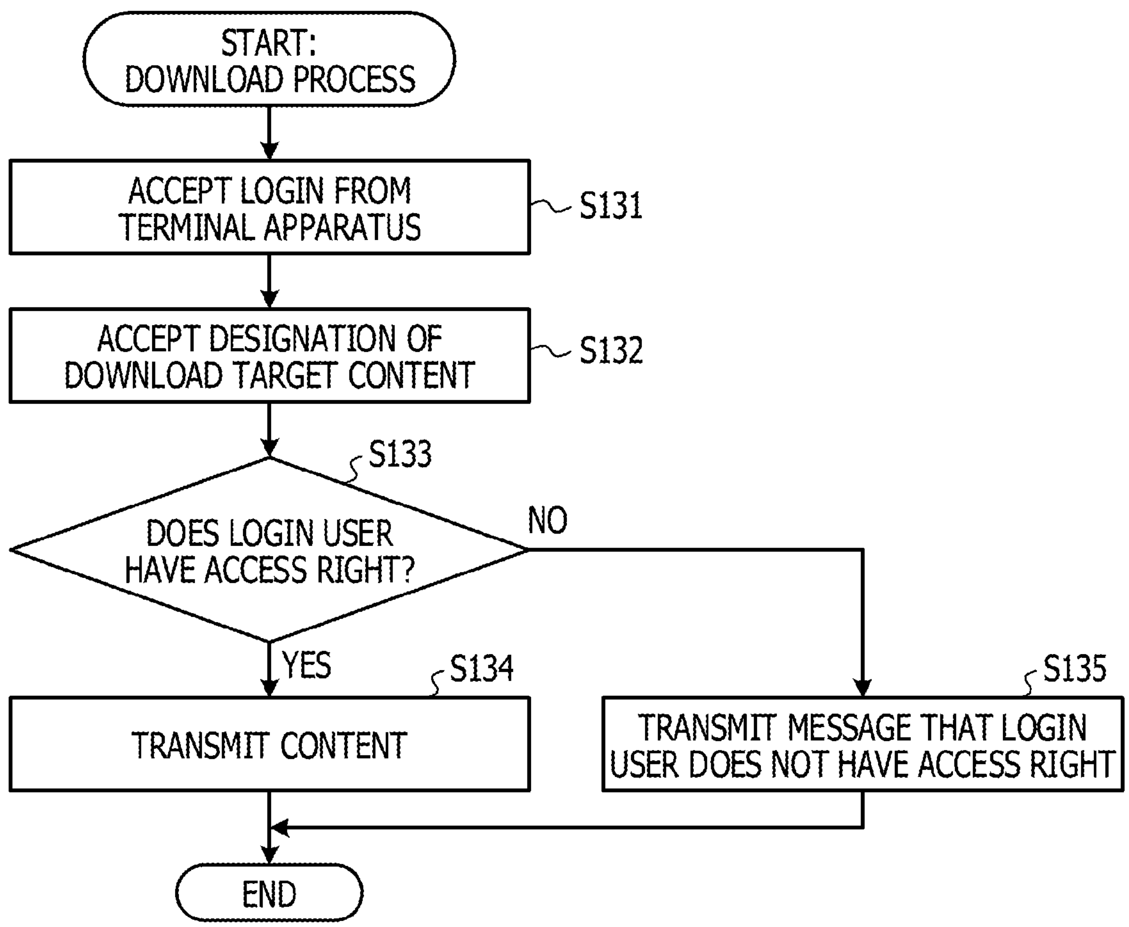
FIG. 16 is a flow chart depicting an example of a procedure of a content download process.

FIG. 16 is a flow chart depicting an example of a procedure of a content download process. In the following, the process depicted in FIG. 16 is described in accordance with step numbers.

[Step S131] The content management unit 120 accepts login from a terminal apparatus. For example, if the content management unit 120 receives a login request from a terminal apparatus, it transmits an inputting request for a user ID and a password to the terminal apparatus. If the content management unit 120 receives a user ID and a password from the terminal apparatus, it collates the set of the received user ID and password and user information of the users in the user management table 113 with each other. If pertinent user information is found, the content management unit 120 permits login to the place server 100 with the user ID indicated in the user information.

[Step S132] The content management unit 120 accepts a designation of a download target content from the terminal apparatus.

[Step S133] The content management unit 120 decides whether or not the login user has an access right to the designated content. For example, the content management unit 120 refers to the content management information 111 to confirm the access right set in an associated relationship with the user ID of the login user. In the case where reference to the content is permitted as the access right of the pertinent user, the content management unit 120 decides that the user has the access right. In the case where the user has an access right, the content management unit 120 advances the processing to step S134. However, if the user does not have an access right, the content management unit 120 advances the processing to step S135.

[Step S134] The content management unit 120 transmits the designated content to the terminal apparatus. Thereafter, the content management unit 120 ends the content download process.

[Step S135] The content management unit 120 transmits to the terminal apparatus a message that the user does not have an access right.

In this manner, if an access right indicative of permission of reference to a content is set to a user, the content may be downloaded to a terminal apparatus of the user. In contrast, if an access right to a content is not set to a user, the content is not downloaded to the user.

As described above, with the second embodiment, a user may perform setting of a personal space and registration of a content into the personal space only by an inputting behavior using an electronic pen in a spatial UI. If a user ID of a user is set in the personal space, to a registered content, the user ID of the user who has created the content is given automatically. This makes it possible to decide who is a creator of the content registered in the spatial UI. For example, when details of an idea indicated by a content are to be confirmed, to whom the details are to be confirmed may be decided based on the user ID associated with the content.

Further, since a creator of a content is managed, an access right to the content may be set freely in accordance with a will of the creator. For example, it is possible to set, in accordance with a will of a user who has created a content, the substance of the content so as not to be disclosable to a user in any other base. Further, in accordance with a will of a user who has created a content, it is possible to restrict users to whom downloading of the content may be permitted.

Other Embodiments

Although, in the first and second embodiments, an inputting behavior of a user is detected based on an irradiation point of an electronic pen used by the user, also it is possible to detect an inputting behavior by a different method. For example, it is possible to attach a marker, which is often used in motion capture or the like, to a fingertip of a user such that, by capturing a movement of the maker by a camera, an inputting behavior of the user may be detected. Also it is possible to image a user by a camera and decide, for example, a movement of a fingertip of the user by image analysis to detect the movement as an inputting behavior of the user.

Further, although, in the first and second embodiments, an image is displayed on a table by a projector, a display apparatus such as a liquid crystal display apparatus or an organic EL display apparatus may be incorporated on an upper face of a table such that an image is displayed by the display apparatus. In this case, if a touch panel is provided on the display face of the display apparatus, a touched position of the touch panel by a user may be detected as an inputting behavior of the user.

While, in the second embodiment, upon downloading of a content, login from a terminal apparatus is accepted to specify a user of the terminal apparatus, the place server 100 may otherwise have identifiers and users of terminal apparatus stored in an associated relationship with each other therein. In this case, the place server 100 receiving a download request for a content from a terminal apparatus decides a user who uses the terminal apparatus based on the identifier of the terminal apparatus. Then, if reference to the content is permitted to the user who uses the terminal apparatus, the place server 100 transmits the content to the terminal apparatus.

Although the embodiments are exemplified above, the configuration of the components indicated in the embodiments may be replaced with a configuration of a different component having a similar function. Further, other arbitrary components or processes may be added. Furthermore, arbitrary two or more components (features) in the embodiments described hereinabove may be combined suitably.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An input information management apparatus comprising:

one or more sensors;

one or more memories; and one or more processors coupled to the one or more memories and the one or more processors configured to:

acquire a first input and a second input detected by the one or more sensors;

in response to the acquiring of the first input, detect a first region being a region surrounded by a border along a locus of the first input;

associate the detected first region related to the first input with identification information of a first user according to the second input; and in response to a third input within the detected first region, store information related to the third input in association with the identification information of the first user into the one or more memories.

2. The input information management apparatus according to claim 1, wherein the one or more processors are configured to perform determination of the first region based on a locus of a position designated by the first input.

3. The input information management apparatus according to claim 2, wherein the determination includes detecting a first figure drawn by the locus of the designated position and determining a region surrounded by the first figure as the first region.

4. The input information management apparatus according to claim 1, wherein the one or more processors are configured to determine the identification information of the first user based on a locus of a position designated by the second input.

5. The input information management apparatus according to claim 1, wherein the one or plurality of sensors are one or more cameras; and each input of the first input and the second input is each behavior of a target decided from images captured by the one or more cameras.

6. The input information management apparatus according to claim 1, wherein the one or more processors are configured to set, when a fourth input in a specific region is detected, an access right to the information related to the third input in response to the fourth input.

7. A computer-implemented input information management method comprising:

acquiring a first input and a second input detected by one or more sensors;

in response to the acquiring of the first input, detecting a first region being a region surrounded by a border along a locus of the first input;

associating the detected first region related to the first input with identification information of a first user according to the second input; and in response to a third input within the detected first region, storing information related to the third input in association with the identification information of the first user into a memory.

8. The input information management method according to claim 7, further comprising:

determining the first region based on a locus of a position designated by the first input.

9. The input information management method according to claim 8, wherein the determining includes detecting a first figure drawn by the locus of the designated position and determining a region surrounded by the first figure as the first region.

10. The input information management method according to claim 7, further comprising:

determining the identification information of the first user based on a locus of a position designated by the second input.

11. The input information management method according to claim 7, wherein the one or plurality of sensors are one or more cameras; and each input of the first input and the second input is each behavior of a target decided from images captured by the one or more cameras.

12. The input information management method according to claim 7, wherein the one or more processors are configured to set, when a fourth input in a specific region is detected, an access right to the information related to the third input in response to the fourth input.

13. A non-transitory computer-readable medium storing instructions executable by one or more computers, the instructions comprising:

acquiring a first input and a second input detected by one or more sensors;

in response to the acquiring of the first input, detect a first region being a region surrounded by a border along a locus of the first input;

associating the detected first region related to the first input with identification information of a first user according to the second input; and in response to a third input within the detected first region, storing information related to the third input in association with the identification information of the first user into a memory.

* * * * *